United States Patent
Sumimoto

(10) Patent No.: US 6,975,046 B2
(45) Date of Patent: Dec. 13, 2005

(54) INTERNAL COMBUSTION ENGINE CONTROL SYSTEM FOR VEHICLE AND CONTROL METHOD THEREOF

(75) Inventor: Katsuyuki Sumimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 335 days.

(21) Appl. No.: 10/158,081

(22) Filed: May 31, 2002

(65) Prior Publication Data

US 2002/0195822 A1 Dec. 26, 2002

(30) Foreign Application Priority Data

Jun. 7, 2001 (JP) .......................... P2001-172560

(51) Int. Cl.⁷ .............................................. B60L 1/00
(52) U.S. Cl. ..................................... 307/9.1; 307/10.1
(58) Field of Search ........................ 307/9.1, 153, 34, 307/10.1; 123/351, 366; 340/455; 361/21, 361/93.8

(56) References Cited

U.S. PATENT DOCUMENTS

| | | | |
|---|---|---|---|
| 3,594,628 A * | 7/1971 | Gutzmer et al. .............. 320/127 |
| 4,191,992 A * | 3/1980 | Johannessen ................. 363/50 |
| 4,232,231 A * | 11/1980 | Reed .......................... 307/10.1 |
| 4,511,790 A * | 4/1985 | Kozak ......................... 219/486 |
| 4,661,760 A * | 4/1987 | Goto et al. ................... 322/27 |
| 4,894,602 A * | 1/1990 | Davis et al. .................. 322/38 |
| 5,166,854 A * | 11/1992 | Morishige .................... 361/91.6 |
| 5,297,015 A * | 3/1994 | Miyazaki et al. ............. 363/146 |
| 5,311,063 A * | 5/1994 | Hubler ........................ 290/40 C |
| 5,331,214 A * | 7/1994 | Mori et al. ................... 307/116 |
| 5,332,927 A * | 7/1994 | Paul et al. .................... 307/66 |
| 5,523,631 A * | 6/1996 | Fishman et al. .............. 307/38 |
| 5,767,636 A * | 6/1998 | Kanazawa et al. .......... 318/139 |
| 5,905,357 A * | 5/1999 | Kawasaki .................... 320/104 |
| 6,169,953 B1 * | 1/2001 | Panoushek et al. .......... 701/99 |
| 6,307,279 B1 * | 10/2001 | Yoshida et al. ............. 307/10.1 |
| 6,371,887 B1 * | 4/2002 | Miller ......................... 477/115 |
| 6,429,540 B1 * | 8/2002 | Dunsworth et al. ........ 290/40 A |
| 6,504,696 B1 * | 1/2003 | Mikosz et al. .............. 361/93.8 |
| 6,646,845 B1 * | 11/2003 | Turner et al. ................ 361/86 |

FOREIGN PATENT DOCUMENTS

| | | |
|---|---|---|
| JP | 8-79981 | 3/1996 |
| JP | 11-299123 | 10/1999 |

* cited by examiner

*Primary Examiner*—Robert L. DeBeradinis
(74) *Attorney, Agent, or Firm*—Sughrue Mion, PLLC

(57) ABSTRACT

An internal combustion engine control system for vehicle prevents an electronic device from being damaged due to over-voltage failure of a generator, and enables the vehicle to continue to travel. Over-voltage failure of a vehicle generator (3) is detected from a voltage generated by the vehicle generator (3) and a voltage of a battery (4). When detecting any over-voltage failure, a maximum engine speed limiting apparatus (13) for preventing over speed of an internal combustion engine (1) is controlled to suppress the engine speed. Any electric load that consumes a relatively large current and does not make the traveling dangerous such as headlight (5) or heater heating wire (6) is applied to suppress the over-voltage. The electric load to be applied is increased or decreased depending on magnitude of the over-voltage. Thus the vehicle can continues traveling even if any over-voltage failure occurs.

16 Claims, 11 Drawing Sheets

INTERNAL COMBUSTION ENGINE CONTROL SYSTEM FOR VEHICLE AND CONTROL METHOD THEREOF

BACKGROUND OF THE INVENTION

1. Field of the Invention

The present invention relates to a internal combustion engine control system for vehicle that, when any state of excessive power generation due to abnormality of a vehicle generator occurs, detects the state and controls engine speed of an internal combustion engine and a battery load thereby suppressing over-voltage in electric system.

2. Background Art

A power supply for vehicle is generally constituted of a vehicle generator and a battery to be charged by the vehicle generator, and is arranged such that output from the vehicle generator may be controlled in accordance with a charged state of the battery. Further, to improve reliability of the vehicle, it is a recent trend to employ a system in which an internal combustion engine control apparatus for supervising and controlling the internal combustion engine mounted onto the vehicle sets a target voltage of the vehicle generator according to a traveling state of the vehicle, and controls the output from the vehicle generator in conformity with this target voltage. In such a vehicle generator, it is possible that the vehicle is led into an incapability of traveling in the case of occurring abnormality due to any trouble in generated voltage. Accordingly, various attempts of coping with the abnormality in the generated voltage have been heretofore proposed.

FIGS. 10 and 11 show one example of the manner of coping with such trouble in the conventional vehicle generator. FIG. 10 is a schematic diagram of an electric system of the vehicle, and FIG. 11 is a functional block diagram of the internal combustion engine control apparatus. An internal combustion engine 1 mounted on the vehicle is controlled by an internal combustion engine control apparatus 2 in accordance with a variety of information, and drives the vehicle as well as drives a vehicle generator (AC generator) 3. Output from the vehicle generator 3 charges a battery 4 and, at the same time, supplies a power to various electric loads. As partially shown in FIG. 10, there are electric loads such as a head light 5, a heater heating wire 6, a cooler compressor motor 7 and the like. These electric loads are turned ON/OFF by operation of switches 8 provided at a driver's seat of a vehicle. Further, electric loads such as an electronic device 9 including a control device for the traveling system or other electronic device 10 are used.

The internal combustion engine control apparatus 2 includes constituting elements and functions such as a unit power supply generation section 11 to which a power is supplied from the battery 4 thereby forming a power supply for itself, battery voltage monitor means 12 for monitoring a battery voltage to perform a fuel injection control, maximum engine speed limiting means 13 for preventing the internal combustion engine 1 from over engine speed, and engine control means 14 for controlling the internal combustion engine 1 including an output from the maximum engine speed limiting means 13. The internal combustion engine control apparatus 2 includes further elements such as power generating state monitor means 15 for monitoring, e.g., a voltage generated by the vehicle generator 3 in response to a signal from a voltage control device incorporated in the vehicle generator 3, over-voltage determination means 16 for determining an over-voltage of the vehicle generator 3 on the basis of the output from the power generating state monitor means 15, and failure alarm control means 17 for generating a failure alarm in response to the output from the over-voltage determination means 16.

In the conventional internal combustion engine control apparatus 2 including above elements and functions, in the case where any trouble occurs at the vehicle generator 3 and the output voltage becomes an over-voltage or under-voltage (power generation incapability), the over-voltage determination means 16 or under-voltage determination means (not shown) operates in response to the output from the power generating state monitor means 15, indicates the failure alarm using display means 19 such as a lamp or a light emitting diode, and tells the trouble to a driver. In the conventional apparatus, this alarm display is a final output from the power generating state monitor means 15, and any emergency measure for the failure is entirely left to the driver. For example, the Japanese Patent Publication (unexamined) No. 79981/1996 disclosed a technique like this, and in which the internal combustion engine control apparatus compensates the control of the generated voltage in accordance with a difference between a target voltage and a battery voltage, such that the failure is determined and abnormality is indicated in the case where a compensation value exceeds a threshold value.

On the other hand, another attempt different from the above-mentioned measures is disclosed, for example, in the Japanese Patent Publication (unexamined) No. 299123/1999. In the technique disclosed in this official gazette, the vehicle generator includes means for detecting the generated voltage, a dual voltage control device, and switching means for switching the dual voltage control device. In this arrangement, engine speed of the internal combustion engine and voltage generated by the vehicle generator are inputted. When the engine speed is not less than a predetermined value, and the output voltage is either less than a first predetermined value or is not less than a second predetermined value, it is determined that the voltage control device is in failure. Then, the currently using voltage control device is switched to a backup one, and an alarm is given to the driver as well.

In the case where the vehicle generator is in failure, either of the two phenomena, under-voltage (power generation incapability) and over-voltage (excess voltage) occurs. In time of the under-voltage, the traveling to some degree is possible on condition that the power charged in the battery has a reserve capability. On the contrary, in the case of over-voltage, charge amount for the battery increases, and the battery voltage abnormally rises when the charge amount exceeds a limit. This abnormal rise of the battery voltage not only extremely shortens the life of battery but also a high voltage will be applied to the vehicle-mounted electronic devices. Moreover, when continuing such a high voltage state, a secondary failure incapable of being restored will occur in the electronic devices. The failure in the electronic device is led into traveling incapability of the vehicle, and the abnormal rise in the battery voltage induces generation of a poisonous gas and explosion thereof. Therefore the failure of over-voltage is a trouble to be prevented by all means. In addition, it is essential to make the vehicle generator small in size and light in weight. From this viewpoint, it is actually difficult to achieve dual system of the voltage control device incorporated in the vehicle generator as described in the known art.

SUMMARY OF THE INVENTION

The present invention was made to solve the above-discussed problems. An object of the invention is to provide an internal combustion engine control system for vehicle that is capable of preventing an electronic device from being damaged and a battery from generating any poisonous gas. Any failure or failure occurred in vehicle generator is detected, and engine speed of an internal combustion engine and electric load are controlled to suppress any abnormal rise in voltage, eventually making it possible for the vehicle to continue travelling.

An internal combustion engine control system for vehicle according to the invention includes: power generation information monitor means for monitoring a power generation information including a voltage generated by a vehicle generator driven by means of an internal combustion engine; maximum engine speed limiting means for imposing a limit on a maximum engine speed of the internal combustion engine using a command signal; and secondary failure avoiding control means for feeding the command signal to the maximum engine speed limiting means and maintaining the voltage generated by the vehicle generator at a normal value to avoid a secondary failure due to abnormality in the generated voltage in the case where it is determined that the generated voltage exceeds a predetermined value.

As a result of such arrangement, an advantage is exhibited such that, in case of an over-voltage failure at the vehicle generator, imposing a limit on a revolving speed of the vehicle generator drops the generated voltage. Further by making it possible to travel the vehicle under predetermined conditions while maintaining the generated voltage at a normal value, secondary failure such as damage to any electronic device due to the over-voltage or generation of a poisonous gas from a battery can be avoided.

Another internal combustion engine control system for vehicle according to the invention includes: battery voltage monitor means for monitoring a battery voltage charged from a vehicle generator; maximum engine speed limiting means for imposing a limit on a maximum engine speed of the internal combustion engine using a command signal; and secondary failure avoiding control means for feeding the command signal to the maximum engine speed limiting means, suppressing abnormality in battery voltage by maintaining a voltage generated by the vehicle generator at a normal value, and avoiding a secondary failure due to abnormality in battery voltage in the case where it is determined that the battery voltage exceeds a predetermined value.

As a result of such arrangement, an advantage is exhibited such that traveling can be performed under predetermined conditions while avoiding the secondary failure such as damage to the electronic device and generation of the poisonous gas from the battery due to over-voltage in the battery voltage.

A method for controlling a vehicle internal combustion engine includes steps of: detecting a voltage generated by a vehicle generator driven by means of an internal combustion engine and a battery voltage charged from said vehicle generator; operating maximum engine speed limiting means for imposing a limit on a maximum engine speed of the internal combustion engine to impose a limit on a revolving speed of the vehicle generator when the generated voltage and/or the battery voltage exceeds a predetermined voltage; and maintaining the generated voltage and the battery voltage at a normal value by turning ON or OFF an electric load that receives a power supply from the battery to avoid a secondary failure due to abnormality in voltage.

As a result of such control method, an advantage is exhibited such that the revolving speed of the vehicle generator is limited in case of the over-voltage failure at the vehicle generator. Further, an electric load is applied as a battery load to drop the generated voltage thereby enabling the vehicle to continue to travel while the generated voltage being maintained at a normal value. Thus, it is possible to provide a control method capable of avoiding the secondary failure such as damage to the electronic device and generation of the poisonous gas from the battery due to the over-voltage.

Other objects, features and advantages of the invention will become apparent from the following description with reference to the accompanying drawings.

DESCRIPTION OF THE PREFERRED EMBODIMENTS

Embodiment 1.

Figure 1:
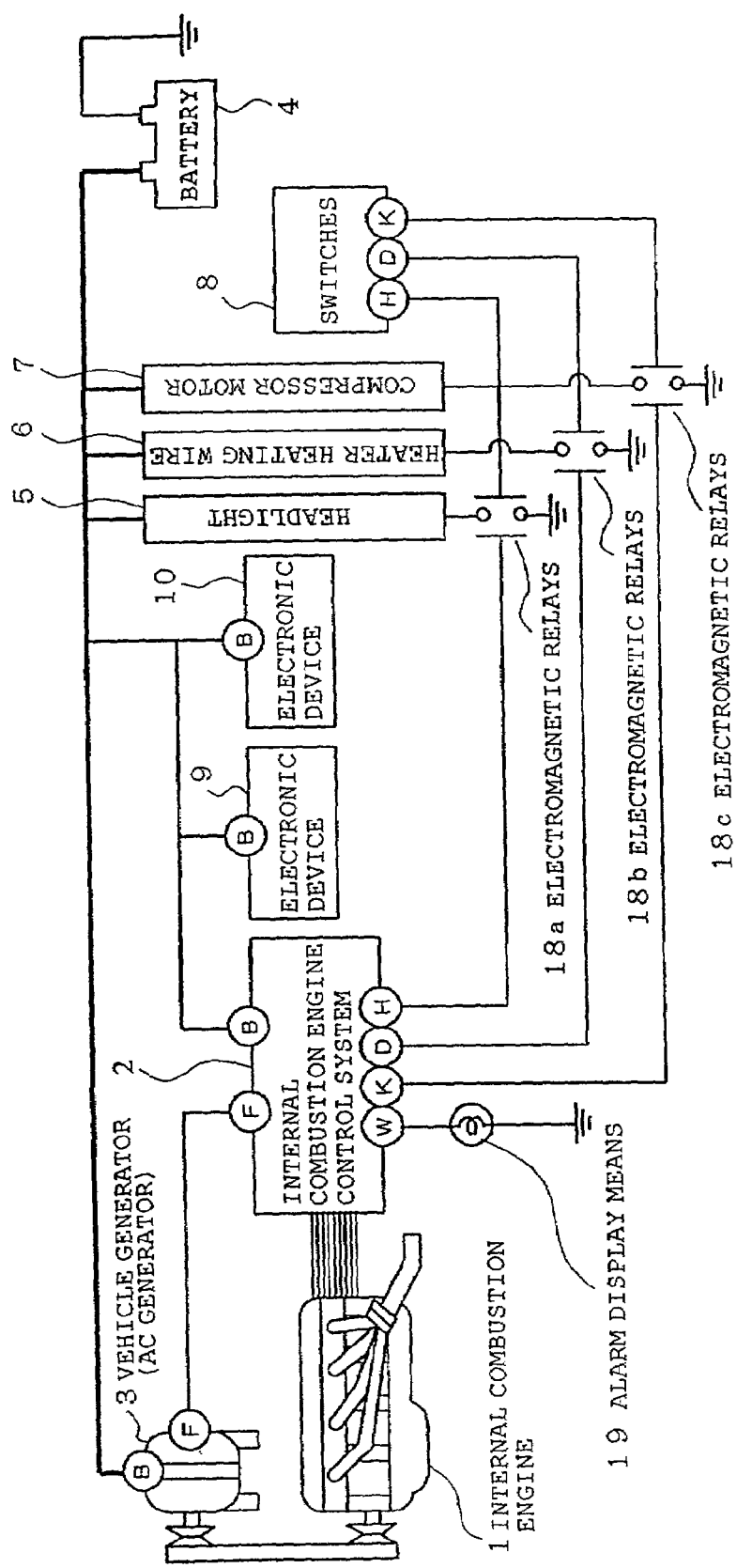
FIG. 1 is an electric system diagram of an internal combustion engine control system for vehicle according to a first preferred embodiment of the present invention.
Figure 2:
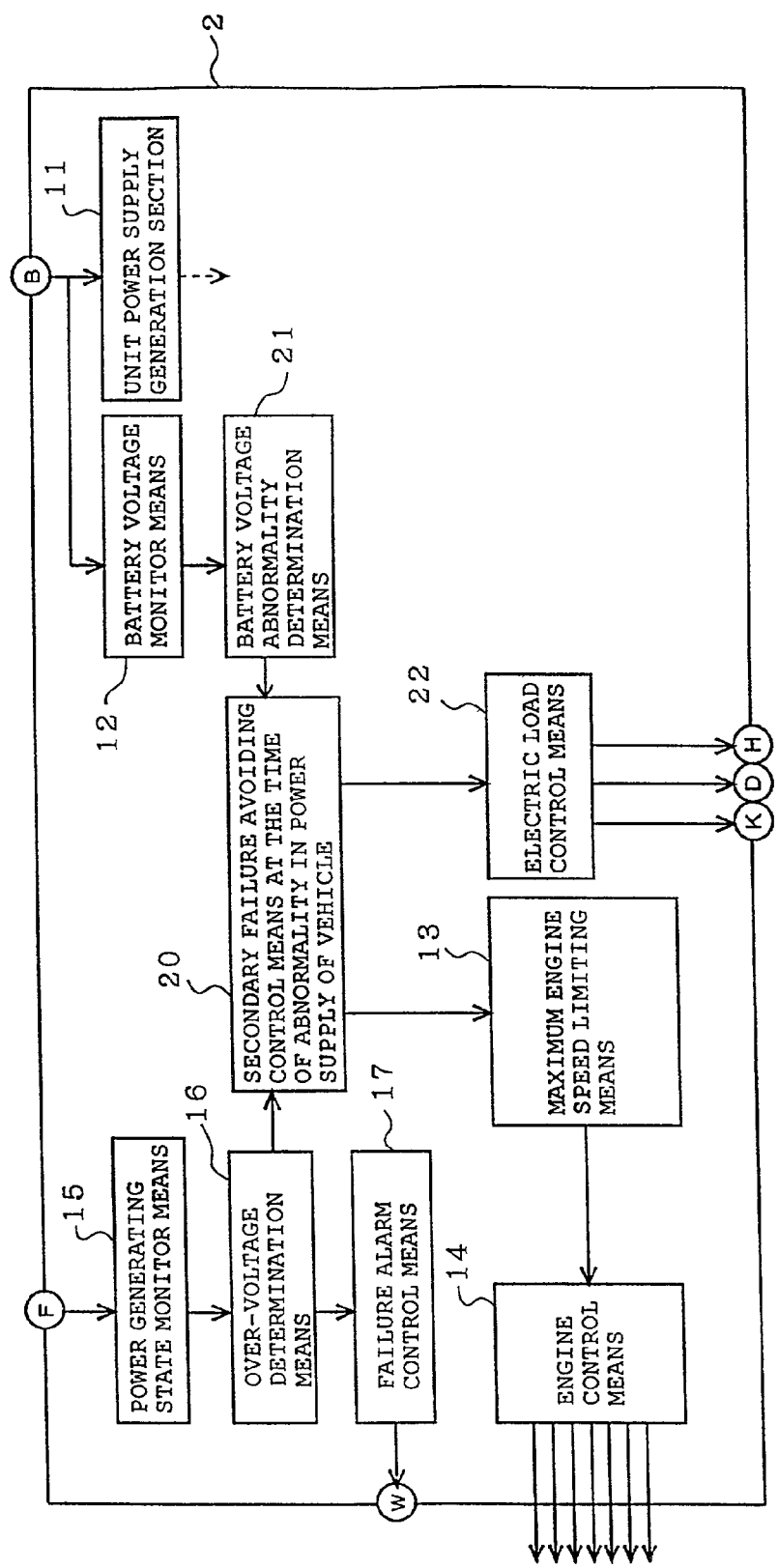
FIG. 2 is a functional block diagram of the internal combustion engine control system for vehicle according to the first embodiment of the invention.
Figure 3:
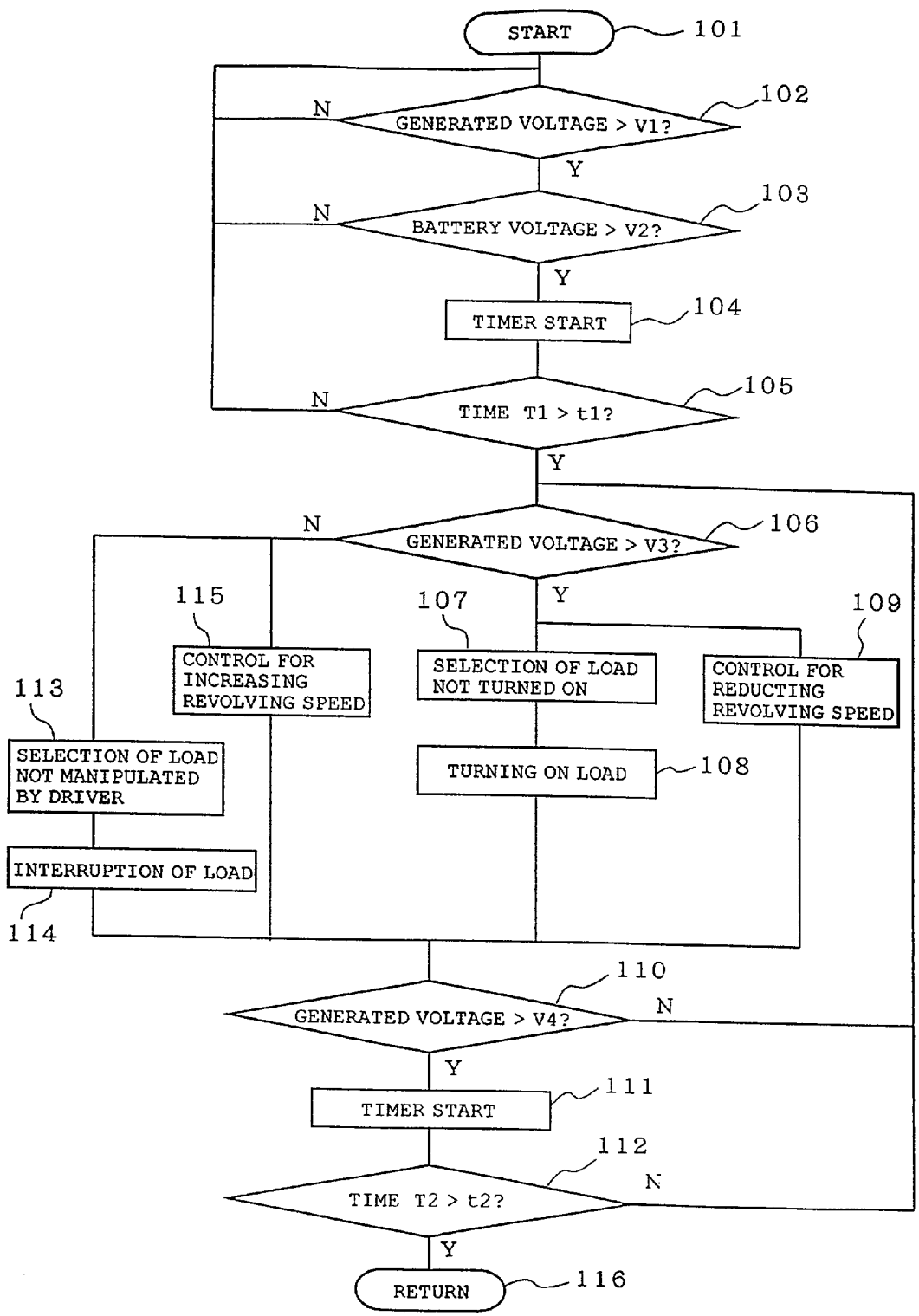
FIG. 3 is a flowchart for explaining operation of the internal combustion engine control system for vehicle according to the first embodiment of the invention.

FIGS. 1 to 3 are diagrams to explain an internal combustion engine control system for vehicle according to a first preferred embodiment of the present invention. FIG. 1 is a system diagram extracting and showing related sections according to this embodiment of an electric system of a vehicle. FIG. 2 is a functional block diagram of the internal combustion engine control apparatus. FIG. 3 is a flowchart explaining one example of an operation, in which the same reference numerals are designated to the same functional sections as in the above-mentioned prior art.

Referring to FIG. 1, an internal combustion engine 1 is controlled by means of an internal combustion engine control apparatus 2 on the basis of various information including manipulation condition for driver, exhaust gas, etc. and drives the vehicle as well as a vehicle generator 3 (AC generator). An AC current output from the vehicle generator 3 is rectified by means of a rectifier incorporated in the vehicle generator 3, further controlled to be a predetermined voltage by means of a voltage control device incorporated therein to charge a battery 4, and supplies power to a variety of electric loads. As partially shown in FIG. 1 there are a headlight 5, a heater heating wire 6, a cooler compressor motor 7 and the like serving as the electric load which consumes a relatively large power. As further electric load consuming a relatively large amount of power, there are a window defroster heating wire, a cooling fan motor for the internal combustion engine and the like, though not shown.

These electric loads are ON/OFF by means of electromagnetic relays 18a to 18c that are operated by manipulating switches 8 provided at a driver's seat of the vehicle. However, the electromagnetic relays 18a to 18c are also operated in response to signals from the internal combustion engine control apparatus 2, thus being arranged so as to be operated either by manual operation from the driver's seat or by signal operation from the internal combustion engine control apparatus 2. As further electric loads, there are electronic devices 9 and 10 for performing various controls including a control device for controlling traveling system, and these devices are also supplied with power from the battery 4. In addition, the internal combustion engine control apparatus 2 not only controls the internal combustion engine 1 but also controls, e.g., the vehicle generator 3 or the electric load and causes alarm display means 19 to be lit on the occasion of any failure as described later.

The internal combustion engine control apparatus 2 is arranged so as to perform the following functions as is understood from FIG. 2. A unit power supply generation section 11 receives the power supply from the battery 4, and generates the power supply required for operating the internal combustion engine control apparatus 2. Battery voltage monitor means 12 monitors the battery voltage, and opens and closes a fuel injection valve (not shown) in accordance with the battery voltage, thereby obtaining a fuel injection amount unaffected by the battery voltage. Furthermore, in the invention, abnormality in the power supply of the vehicle is detected by monitoring the battery voltage. Maximum engine speed limiting means 13 normally impose a limit on the maximum engine speed so as to prevent the internal combustion engine 1 from exceeding a predetermined engine speed. However, as described later, in the invention, the system is arranged so that the limit engine speed of the maximum engine speed limiting means 13 may be controlled due to voltage abnormality in the vehicle generator 3 or the battery 4.

Engine control means 14 is to control the internal combustion engine 1 including the output from the maximum engine speed limiting means 13, and furthermore fuel injection control and other controls are also performed though not shown. Power generating state monitor means 15 is to monitor the power generating state such as voltage generated by the vehicle generator 3 in response to the signal from the voltage control device incorporated in the vehicle generator 3. Over-voltage determination means 16 is to determine the over-voltage of the vehicle generator 3 based on the output from the power generating state monitor means 15.

When the over-voltage determination means 16 determines an over-voltage, the information thereof is fed to failure alarm control means 17, and causes alarm display means 19 to be lit to display the failure. ¥Further, secondary failure avoiding control means 20 is also provided with the over-voltage information.

On the other hand, the battery voltage monitor means 12 monitors the battery voltage. In the case where the battery voltage exceeds a predetermined value, battery voltage abnormality determination means 21 detects it and feeds the over-voltage information to the secondary failure avoiding control means 20. The secondary failure avoiding control means 20 operates upon receiving the over-voltage information from the over-voltage determination means 16 and battery voltage abnormality determination means 21, and delivers a signal to electric load control means 22 and the maximum engine speed limiting means 13. Then the secondary failure avoiding control means 20 imposes a limit on the engine speed of the internal combustion engine and accordingly on the revolving speed of the vehicle generator 3. The means 20 further selects an electric load depending on a degree of the over-voltage to feed signals to the electromagnetic relays 18a to 18c, and automatically applies the selected load.

The over-voltage failure at the vehicle generator 3 is a result of occurrence of any abnormality at the voltage control device incorporated in the vehicle generator 3 thereby the control being incapable. In such a vehicle generator 3, the power that can be outputted increases together with the revolving speed, and when the electric load is constant, the voltage generated will rise as the revolving speed increases. When the revolving speed is constant, the generated voltage will drop as the electric load increases. Even under the normal state, the voltage generated in the vehicle generator 3 cannot immediately follow the variation in load when a large power load is OFF. In such a case, the voltage may temporarily rise to induce a phenomenon of so-called overshoot. Time of such overshoot is determined depending on a power generation amount increase/decrease time constant that is inherent in the vehicle generator 3.

In the internal combustion engine control system for vehicle according to the first embodiment of this invention, taking such a characteristic of the vehicle generator 3 into consideration, the control for avoiding the secondary failure in the electronic devices at the time of over-voltage failure, is carried out. The over-voltage determination means 16 and the battery voltage abnormality determination means 21 include a threshold value for determining the over-voltage. The determination means 16 and 21 determines occurrence of the over-voltage abnormality when the voltage at the vehicle generator 3 or the battery 4 exceeds the threshold value and continues the state for a predetermined period of time (i.e., for a time not less than the above-mentioned power generation amount increase/decrease time constant). In the case of receiving the over-voltage information from the over-voltage determination means 16 and the battery voltage abnormality determination means 21, the secondary failure avoiding control means 20 starts the control for avoiding the secondary failure. What are carried out in this avoiding control are downward revision of the limit engine speed of the maximum engine speed limiting means 13 and automatic application of the electric load by the electric load control means 22. In addition, when the secondary failure avoiding control means 20 is operated only in the case where the over-voltage information is inputted from both of the over-voltage determination means 16 and the battery voltage abnormality determination means 21, misjudgment or the like can be prevented. This will eventually result in improvement in reliability.

Electric loads to be automatically applied consume a relatively large power and therefore are selected in preferential order from the one of less danger even if it might be operated during driving. More specifically, the headlight 5, the heater heating wire 6, the cooler compressor motor 7, the widow defroster heating wire or the like consumes a relatively large power and does not have much danger even if it might be operated during driving. Furthermore, operation of the cooling fan motor of the internal combustion engine is possible to induce the over-cooling in the internal combustion engine. However, comparing this trouble with the over-voltage failure, it comes into a category having an extremely little danger. Such an application of the electric loads is determined corresponding to a value of the over-voltage determined by the over-voltage determination means 16 and the battery voltage abnormality determination means 21. Accordingly, the over-voltage due to shortage in applying the electric loads and the over discharge at the battery 4 due to excess in applying the electric loads will be prevented. As a result, in the case where a certain electric load is applied thereby making a voltage generated by the vehicle generator 3 lower and this voltage becomes lower than a predetermined value, this electric load will be interrupted. Thus, either other electric load will be selected or ON/OFF control will be conducted.

In addition, a limit value of the maximum engine speed when the maximum engine speed limiting means 13 is controlled by the secondary failure avoiding control means 20, is not primarily determined but controlled depending upon the amount of applied electric loads. When it is determined that the driver intends to increase the rotation by means of, for example, an accelerator opening, the limit engine speed is to be increased while increasing the applied load corresponding to a value of the over-voltage determined by the over-voltage determination means 16 and the battery voltage abnormality determination means 21. Note that maximum value of the limit engine speed is limited in accordance with the amount of whole electric loads that are automatically applied. Further, though not shown, by outputting a control signal of the secondary failure avoiding control means 20 to the control device for a traveling system, and downwardly revising a revolving speed of a gear change at an automatic transmission, it is also possible to travel to a repair plant in a manner close to a normal traveling without exceedingly increasing the engine speed of the internal combustion engine.

As described above, the over-voltage failure in the vehicle generator 3 means is caused by any abnormality occurred in the voltage control device incorporated in the vehicle generator 3. In this case, there is produced some portions unstable in terms of connection depending on a connection state of circuit including an internal circuit at the voltage control device, and it is possible to result in a temporal over-voltage abnormality. To cope with such a case, the abnormal state is restored during the operation of the secondary failure avoiding control means 20, and either signal of the over-voltage determination means 16 or that of the battery voltage abnormality determination means 21, or both of them will be returned to the normal state. In this respect, note that the secondary abnormality avoiding control means 20 does not stop the control operation until both over-voltage determination means 16 and battery voltage abnormality determination means 21 have returned to the normal state. This operation of the secondary abnormality avoiding control means 20 are adopted for the purpose of avoiding misjudgment that may be caused by drop in voltage of the battery 4 by the operation of the secondary failure avoiding control means 20, drop in voltage generated by the vehicle generator 3 due to temporal decrease in rotation of the internal combustion engine 1, failure in any circuit for feeding a signal to the power generating state monitor means 15 or the like.

The secondary failure avoiding control means 20 monitors each of the electric loads automatically applied by the electric load control means 22, manages the switching-on time for the electric load that does not withstand a long time of continuous use. Thus, while controlling amount of the electric loads and value of the limit engine speed by the maximum engine speed limiting means 13, the secondary failure avoiding means 20 switches the applied electric load. Further, the secondary failure avoiding control means 20 stores history of the secondary failure avoiding control, and also the failure history of a temporal over-voltage abnormality. Furthermore, the failure alarm control means 17 continues to light the alarm display means 19 after restoration with respect to the temporal over-voltage abnormality as mentioned above, and lets the driver know that the temporal abnormality has occurred.

The foregoing operation of each section is summarized in a flowchart of FIG. 3 showing an example of the operation. This routine is repeated with intervals of a predetermined period of time. First, the routine starts in step 101, and the generated voltage is detected by the power generating state monitor means 15 in step 102, and it is determined whether or not the generated voltage is not less than a predetermined value V1 by the over-voltage determination means 16. If the generated voltage is not more than a predetermined value V1, the program returns to the start. However, if it is not less than V1, the program proceeds to the next step 103. Though step 103 may be dealt with in parallel to step 102, in this embodiment step 103 described as being dealt with in series. Thus, in step 103, the battery voltage monitor means 12 and the battery voltage abnormality determination means 21 detect the battery voltage, and it is determined whether or not this battery voltage is not less than a predetermined value V2. If the battery voltage is not more than a predetermined value V2, the program returns to the start. Otherwise, if the battery value is not less than V2, the program proceeds to step 104.

In step 104, a timer starts at the first abnormality determination. In step 105, it is determined whether or not this timer has advanced for a predetermined period of time t1. If the elapsed time is less than t1, the program will return to the start. If the elapsed time is not less than t1, the program will proceed to step 106. In step 106, it is confirmed by the secondary failure avoiding control means 20 that the generated voltage is not less than a predetermined value V3, and then the program proceeds to step 107 and step 109. In step 107, an electric load to be applied is selected in accordance with the generated voltage that the electric load control means 22 detects, and then the selected load is applied in step 108. However, the load to be applied is selected from the loads, which have not been applied yet, including manipulation of the switches 8. Further, magnitude of the load is determined depending on the detected generated voltage and a command value to the maximum engine speed limiting means 13 described later.

In step 109, the secondary failure avoiding control means 20 determines a controllable engine speed from the detected generated voltage and operation state of the driver, and transmits the command to the maximum engine speed limiting means 13. Thus, the secondary failure avoiding control means 20 controls the engine speed of the internal combustion engine and, accordingly, the vehicle generator 3 to beat a predetermined value. Selection for the electric load in step 107 is carried out in correspondence with this command value for the engine speed. Subsequently in step 110, it is determined whether or not the generated voltage is not less than a predetermined value V4. If it is not less than V4, steps 106 to 109 are repeated. If it is not more than V4, the timer is started in step 111, and it is determined whether or not the timer has advanced for not less than a predetermined period of time t2.

If the timer have advanced for not more than a predetermined period of time t2, the program returns to step 106, and the secondary failure avoiding control means 20 determines the generated voltage. Then if the generated voltage is not more than a predetermined value V3, proceeding to step 113, an electric load, which is not applied by the manipulation of the switches 8 of the driver, is selected out of the electric loads that have been already applied, and the electric load is interrupted in step 114. Further, when required, the revolving speed of the vehicle generator 3 is controlled so as to go up in step 115. If the timer has advanced for a predetermined period of time t2 in step 112, determining that the abnormality in the generated voltage has been solved, the program returns from step 116 to the start. However, because the generated voltage drops due to application of the electric load, it is desired that a predetermined period of time t2 be set to be relatively long. Furthermore, it is desired that the determination for getting rid of the abnormality may be made when both generated voltage and battery voltage continue to be in the state of not more than a predetermined voltage for not less than a predetermined time.

In addition, though not shown in the flowchart, the timer in step 104 and step 111 is reset when determining that abnormality in the generated voltage is solved in step 112 and returning from step 116. Also in the case where the generated voltage is not less than V4 in step 110, the timer in step 111 is reset every time it occurs. It is preferable that the detection of the generated voltage in step 102 and the detection of the battery voltage in step 103 may be conducted in a parallel manner as described above. Alternatively, either detecting the generated voltage in step 102 or detecting the battery voltage in step 103 can preferably conduct the operations on and from step 104.

As described above, in the internal combustion engine control system for vehicle according to the first embodiment of the invention, in the case where any over-voltage failure occurs in the vehicle generator 3, the engine speed of the internal combustion engine 1 and the electric load on the vehicle generator 3 are controlled thereby surely preventing the battery 4 from the over charge state, or preventing the electronic devices 9 and 10 or the internal combustion engine control apparatus 2 itself from being applied with an over-voltage. Further, in this embodiment, it becomes possible that the vehicle travels in a stable manner to the repair plant and, furthermore, misjudgment in case of a temporal change in conditions can be prevented.

Embodiment 2.

Figure 4:
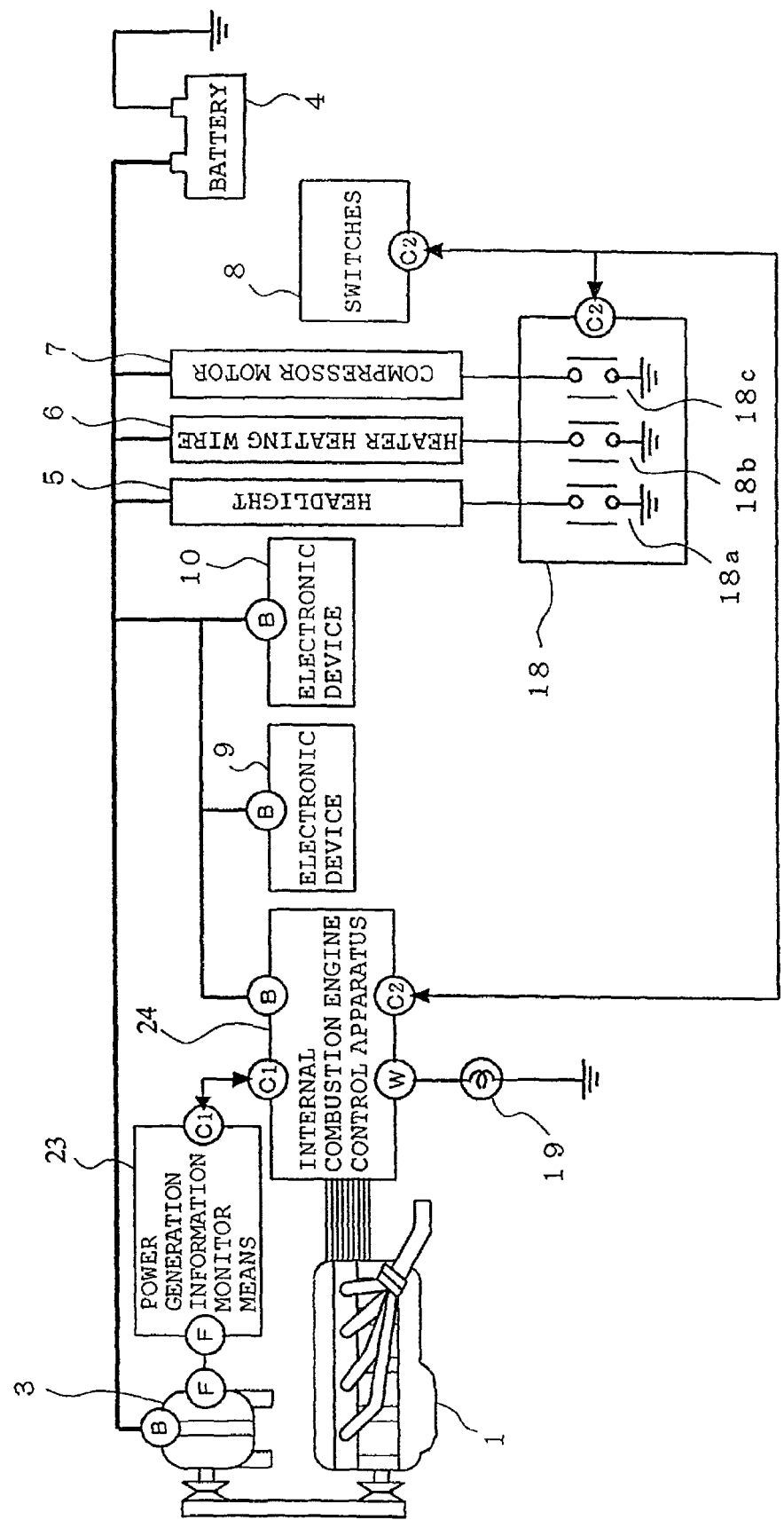
FIG. 4 is an electric system diagram of an internal combustion engine control system for vehicle according to a second embodiment of the invention.
Figure 5:
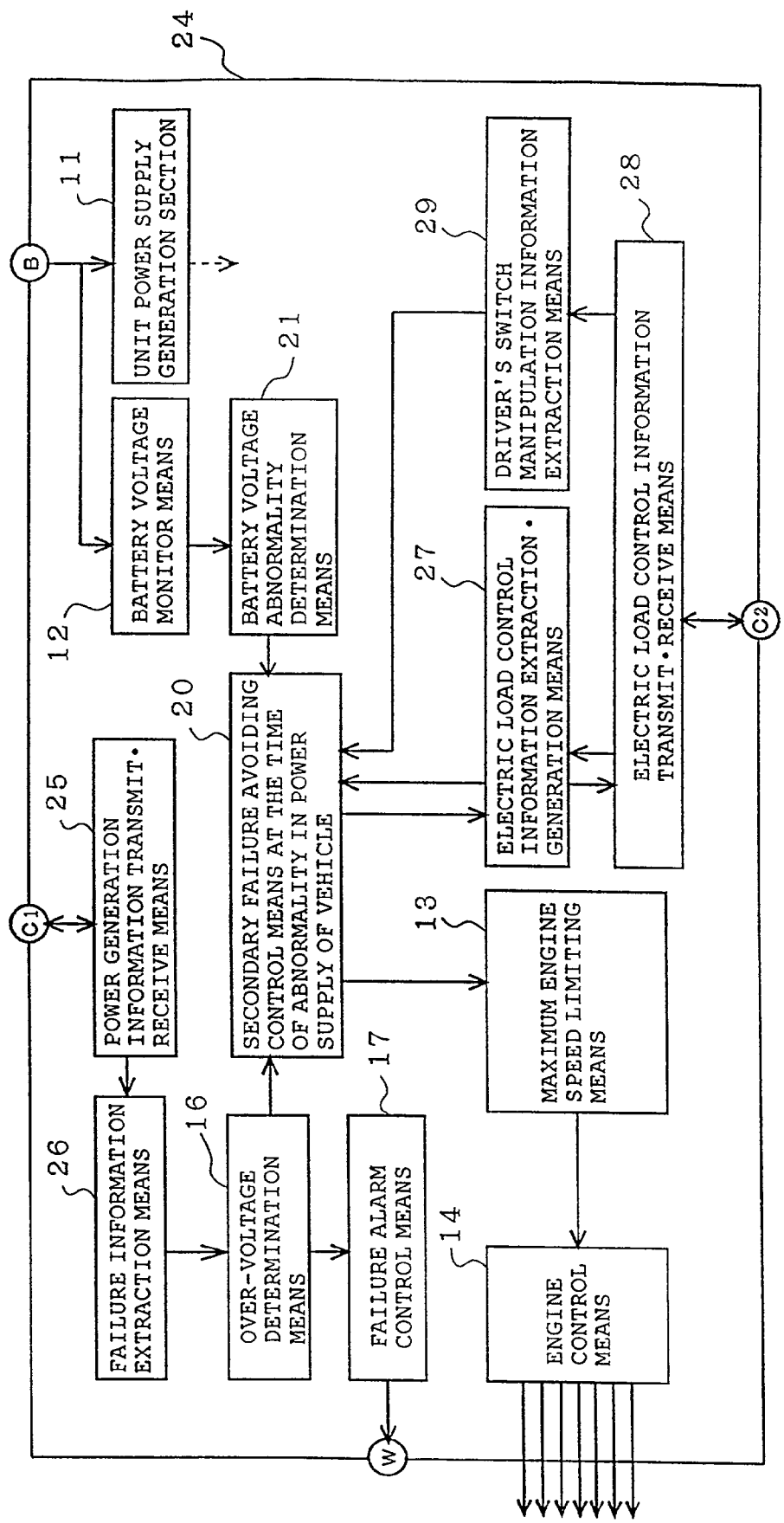
FIG. 5 is a functional block diagram of the internal combustion engine control system of the internal combustion engine control system for vehicle according to the second embodiment of the invention.

FIGS. 4 and 5 are to explain an internal combustion engine control system for vehicle according to a second embodiment of the invention. FIG. 4 is a system diagram extracting and showing related sections according to this embodiment for an electric system of the vehicle. FIG. 5 is a functional block diagram of an internal combustion engine control apparatus. In the internal combustion engine control system for vehicle according to this embodiment, the control for automatically applying the electric loads, being the control for avoiding the secondary failure described in the foregoing first embodiment, is managed synthetically. Further, the electric load applied and controlled is arranged to reflect driver's intention as well as to suppress the increase in wire harness of the vehicle.

Referring to FIG. 4, the vehicle generator 3 is provided with power generation information monitor means 23 for monitoring failure information of the vehicle generator 3 including the voltage control device incorporated in the vehicle generator 3. Power generation information from the power generation information monitor means 23 is transmitted to an internal combustion engine control apparatus 24 through a digital communication line. The control information is transmitted through the digital communication line capable of mutually performing multiplex communication between the internal combustion engine control apparatus 24, the switches 8 provided at the driver's seat and an electric load ON/OFF control unit 18 having electromagnetic relays 18a to 18c. The electric load ON/OFF control unit 18 includes, though not shown, identification means for identifying a destination signal such as ID code included in a control information signal. Thus, it is arranged so that each electromagnetic relay to be operated is identified by the control information signal.

The internal combustion engine control apparatus 24 shown in FIG. 5 is provided with power generation information transmit/receive means 25 for receiving the power generation information that is transmitted from the power generation information monitor means 23 of the vehicle generator 3. The internal combustion engine control apparatus 24 is further provided with failure information extraction means 26 for extracting failure information from the received power generation information and feeding the failure information to the over-voltage determination means 16. The over-voltage determination means 16 extracts over-voltage information from the failure information and determines whether or not any over-voltage occurs. Further, the secondary failure avoiding control means 20 in the internal combustion engine control apparatus 24 starts its operation when the over-voltage information is inputted from both over-voltage determination means 16 and battery voltage abnormality determination means 21. Then, feeding a signal to electric load control information extraction generation means 27 and the maximum engine speed limiting means 13, the secondary failure avoiding control means 20 impose a limit on the engine speed of the internal combustion engine 1 and accordingly on the revolving speed of the vehicle generator 3. At the same time, the secondary failure avoiding control means 20 produces a control information signal with respect to the electric load in accordance with a degree of the over-voltage information and feeds it to control information transmit/receive means 28. This control information signal contains the mentioned destination signal based on the result of selecting the electric load and command information regarding whether the selected electric load is to be turned ON or OFF.

The control information transmit/receive means 28 feeds a control information signal to the electric load ON/OFF control unit 18 to operate the selected electric load. At the same time, receiving signals from the switches 8 provided at the driver's seat and the electric load ON/OFF unit 18, the control information transmit/receive means 28 extracts the electric load manipulated by the driver using switch manipulation information extraction means 29. The electric load manipulated by the driver is fed back to the secondary failure avoiding control means 20. The control information transmit/receive means 28 further extracts the currently operating electric load using the electric load control information extraction generation means 27 and feeds it back to the secondary failure avoiding control means 20. Moreover, under the normal state of operation, the power generation information transmit/receive means 25 commands the power generation information monitor means 23 to monitor a target voltage produced by target voltage setting means not shown. The arrangement and operation other than those described above is similar to those in the foregoing first embodiment.

In the internal combustion engine control system for vehicle according to this second embodiment of above arrangement, the secondary failure avoiding control means 20 carries out selection of electric load and imposition of a limit on the revolving speed of the vehicle generator 3 in order to avoid the over-voltage based on the signals from the switch manipulation information extraction means 29 and the electric load control information extraction generation means 27. That is, the imposition of a limit or restriction on the revolving speed of the vehicle generator 3 is done in the same manner as in the foregoing first embodiment. However, as for the selection of electric load, situation of manipulation of the switches 8 inputted from the switch manipulation information extraction means 29 is based on the intention of the driver, which will be excluded from the electric load to be OFF. Thus, by ON/OFF controlling any other electric load, the control for avoiding the over-voltage as well as over discharge of the battery 4 is carried out.

In addition, in this embodiment, the vehicle generator 3, the internal combustion engine control apparatus 24, the electric load ON/OFF control unit 18 and the switches 8 are connected with one another through a digital communication line. As for communication manner performed between them, transmission of command by means of multiplex communication is carried out using a communication frame that includes at least a field for destination code and a data field in which command information is written. Therefore, implementation of the operations shown in the flowchart of FIG. 3 and described in the foregoing first embodiment will be easier.

In this manner, the internal combustion engine control apparatus 24 carries out a synthetic management and control including the manipulation state of the driver. Therefore, for example, in any over-voltage trouble during traveling at night, since the headlight 5 is to be lit on the driver's will, it will be out of the object of such control. Accordingly, any secondary trouble that impairs a safe traveling can be prevented. In addition, the control of the over-voltage can be made without further increasing a large amount of wire harness of the vehicle.

Embodiment 3.

Figure 6:
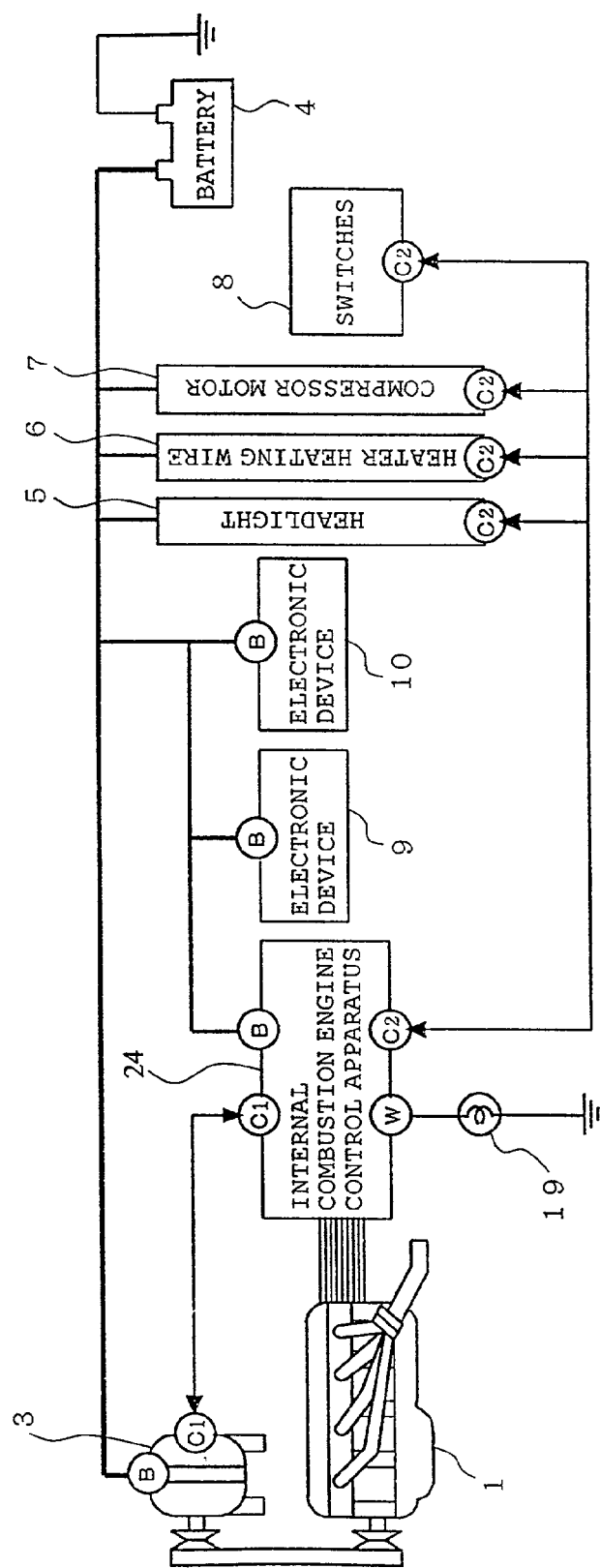
FIG. 6 is an electric system diagram of an internal combustion engine control system for vehicle according to a third embodiment of the invention.
Figure 7:
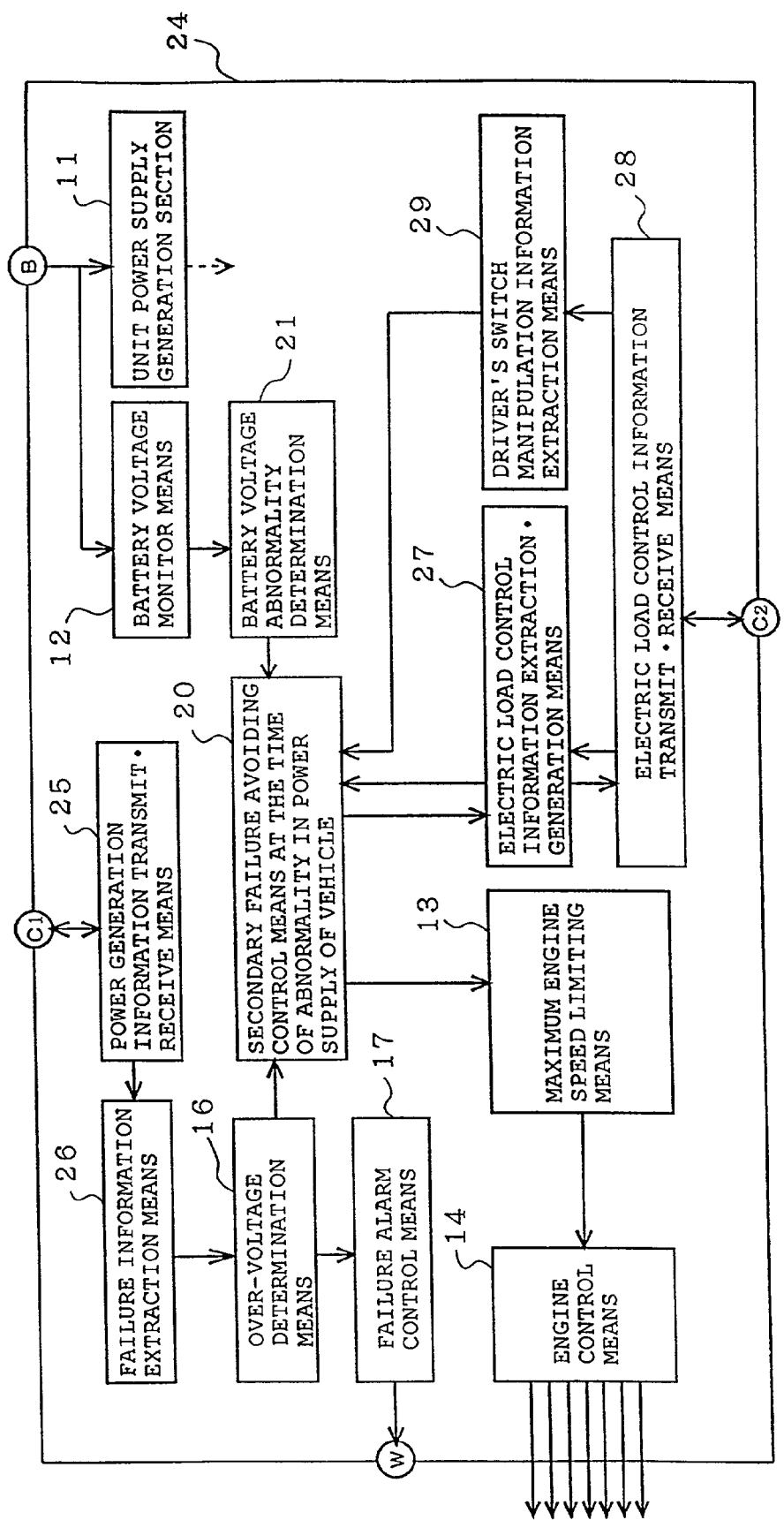
FIG. 7 is a functional block diagram of the internal combustion engine control system for vehicle according to the third embodiment of the invention.

FIGS. 6 and 7 are to explain an internal combustion engine control system for vehicle according to a third preferred embodiment of the invention. FIG. 6 is a system diagram extracting and showing related sections for an electric system of the vehicle according to this embodiment. FIG. 7 is a functional block diagram of an internal combustion engine control apparatus. The internal combustion engine control system for vehicle according to this embodiment shows an example of performing control without using the electric load ON/OFF unit 18 or the like in the internal combustion engine control system for vehicle according to the foregoing second embodiment.

As shown in FIG. 6, the power generation information monitor means 23 described in the foregoing second embodiment is incorporated in the voltage control device not shown that is incorporated in the vehicle generator 3. Delivery and receipt of a signal to and from the internal combustion engine control apparatus 24 are executed directly with respect to the vehicle generator 3. Furthermore, each electric load to be automatically applied such as the headlight 5, the heater heating wire 6 or the cooler compressor motor 7 respectively includes a control unit not shown. The control unit of each electric load decodes a destination signal such as ID code contained in the control information fed from the control information transmit/receive means 28 in the internal combustion engine control apparatus 24 to determine whether or not this signal is provided for the control unit itself. In the case where the signal is a signal provided for the control unit itself, each control unit further decodes a code of the command information to drive a switching element incorporated in the control unit, whereby the electric load is brought into a commanded operation state (i.e., ON or OFF). Furthermore, in the same manner as in the foregoing second embodiment, the manipulation state of the switches 8 or the operation state of the electric load is fed back, thus a synthetic management is carried out.

In this manner, in the internal combustion engine control system for vehicle according to this embodiment, a direct communication between each electric load and the internal combustion engine control apparatus 24 can be done. Therefore, management of the electric loads which have been applied is not performed depending on the application time as described in the foregoing first embodiment, but performed by monitoring the information such as temperature of individual electric loads. As a result, a high reliability can be assured. As described above, though manipulation method of the electric load is different from that in the foregoing second embodiment, the control method for avoiding the secondary failure resulted from the over-voltage abnormality in the vehicle generator 3 is similar to that in the second embodiment, and has similar advantages to those in the foregoing second embodiment.

Embodiment 4.

Figure 8:
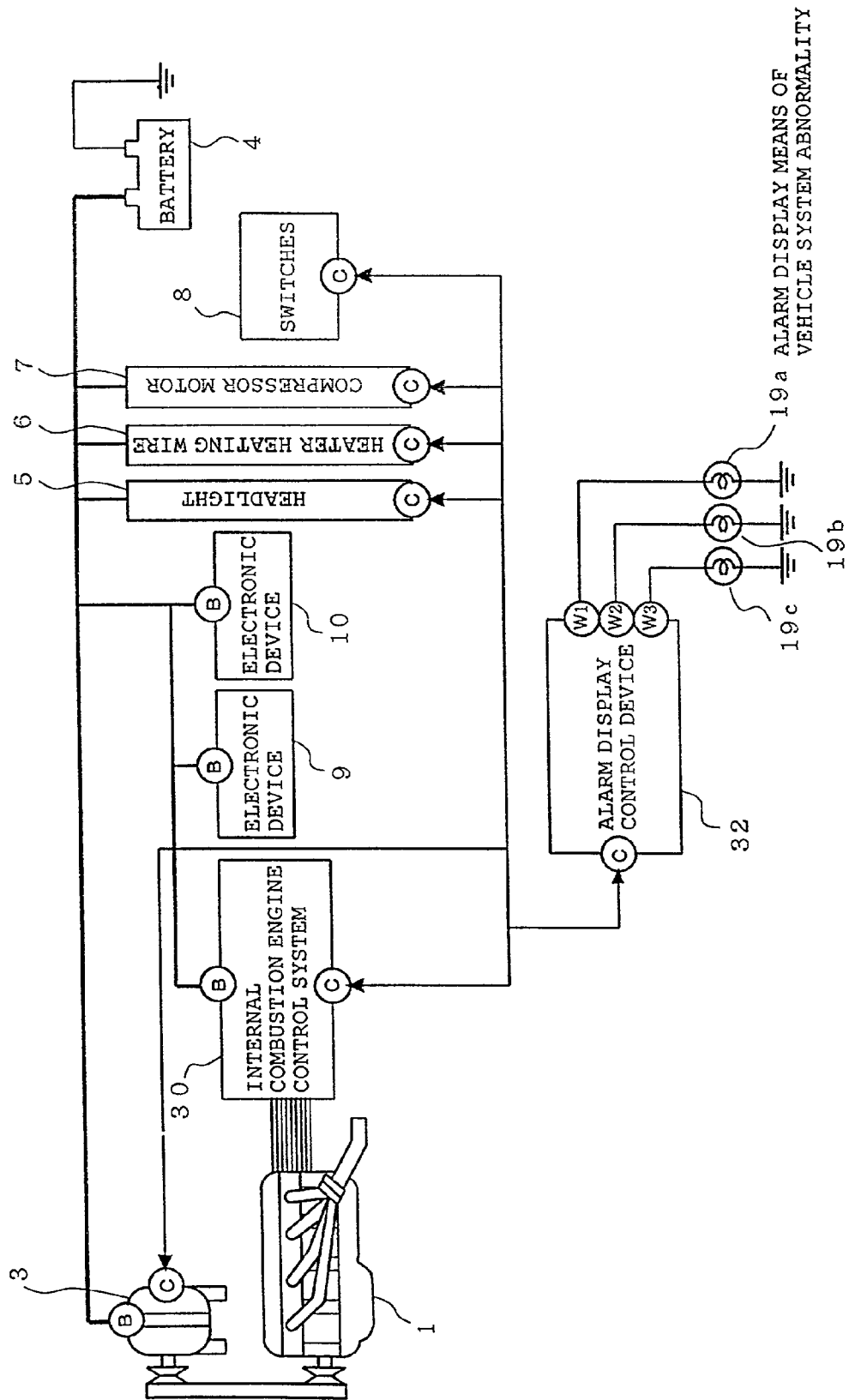
FIG. 8 is an electric system diagram of an internal combustion engine control system for vehicle according to a fourth embodiment of the invention.
Figure 9:
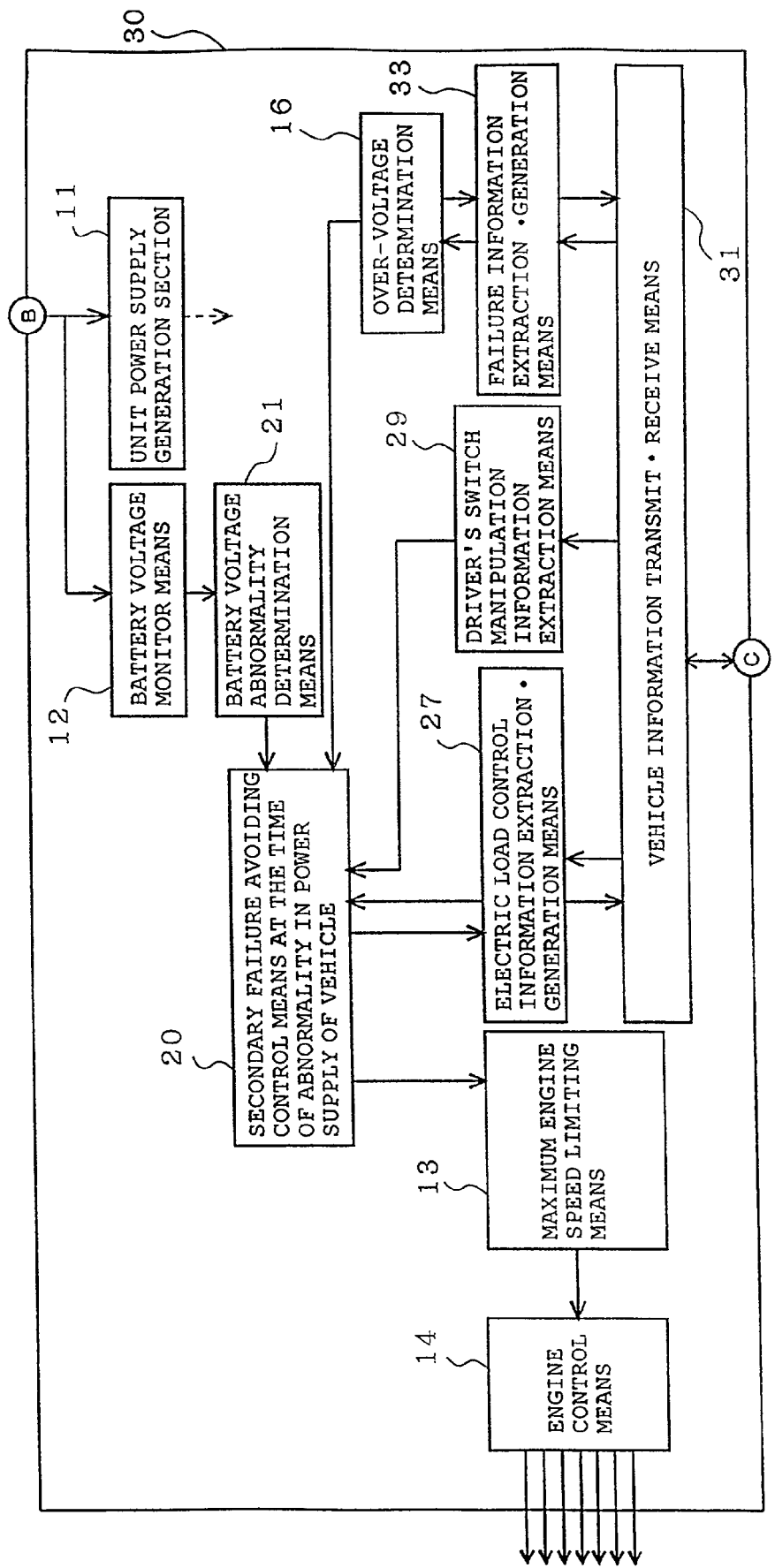
FIG. 9 is a functional block diagram of the internal combustion engine control system for vehicle according to the fourth embodiment of the invention.
Figure 10:
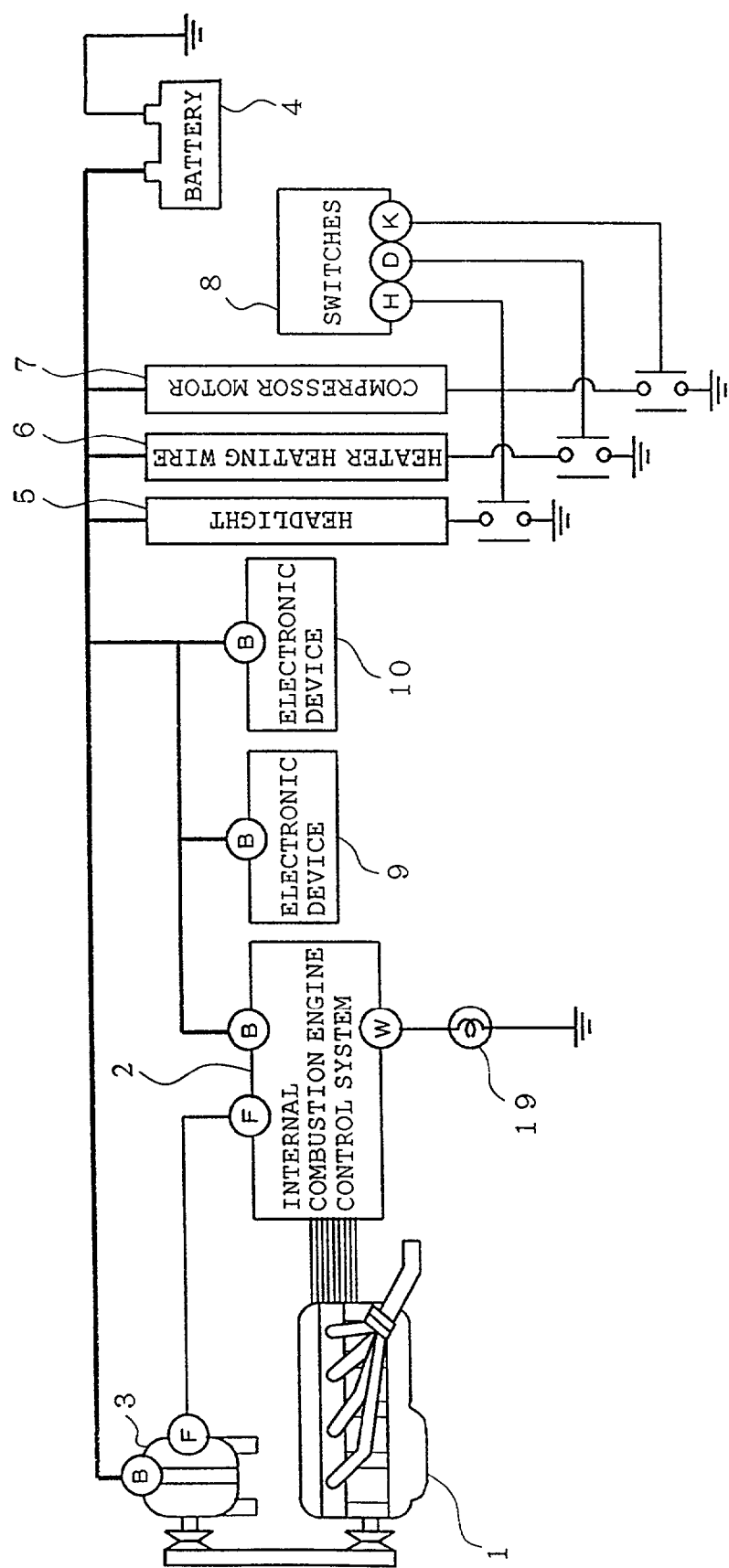
FIG. 10 is an electric system diagram showing a conventional internal combustion engine control system for vehicle.
Figure 11:
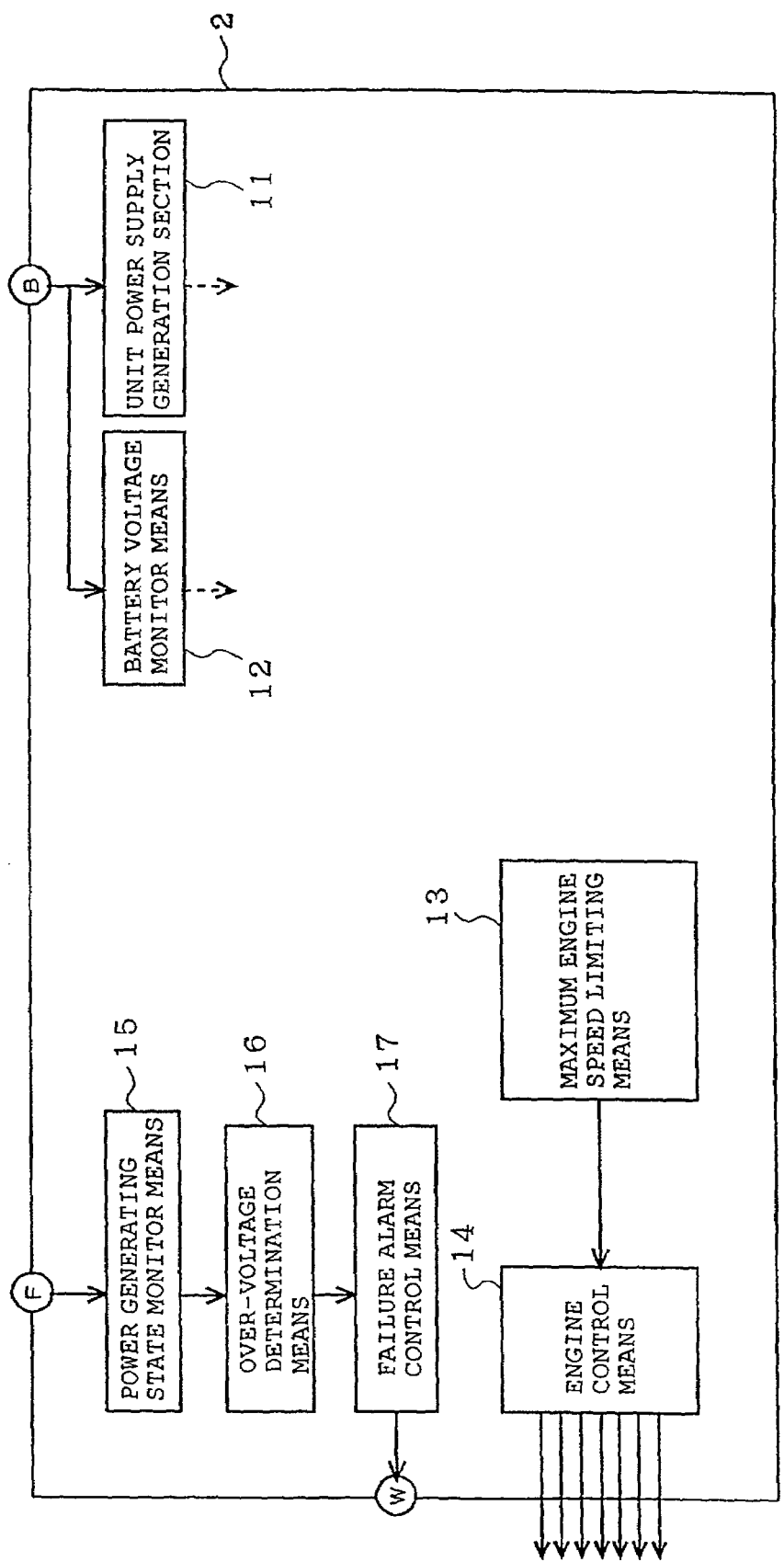
FIG. 11 is a functional block diagram showing the conventional internal combustion engine control system for vehicle.

FIGS. 8 and 9 are to explain an internal combustion engine control system for vehicle according to a fourth preferred embodiment of the invention. FIG. 8 is a system diagram extracting and showing related sections of the electric system of the vehicle according to this embodiment. FIG. 9 is a functional block diagram of the internal combustion engine control apparatus. The internal combustion engine control system for vehicle in this embodiment is a modification of the foregoing third embodiment. In this internal combustion engine control system for vehicle, an input/output circuit with respect to the internal combustion engine control apparatus is simplified so that interface circuits necessary for the input/output circuit may be reduced.

As shown in FIG. 8, alarm display control means 32 operated in response to a command from an internal combustion engine control apparatus 30 is provided in this embodiment. The alarm display control means 32 is arranged so as to indicate each of troubles to be controlled by the internal combustion engine control apparatus 30 including the over-voltage failure in the vehicle generator 3 upon occurring the trouble. The command issued to the alarm display control means 32 is executed in response to the destination signal such as ID code from the internal combustion engine control apparatus 30 in the same manner as in each control unit of the electric load described in the foregoing third embodiment. The alarm display control means 32 is provided with decode determination means for decoding and determining the destination signal such as the ID code.

As shown in FIG. 8, the internal combustion engine control apparatus 30, is arranged such that input/output of information for the vehicle generator 3, command for each electric load, information input from the switches 8 and further command to the alarm display control means 32 may be carried out from one input/output terminal. For that purpose, vehicle information transmit/receive means 31 is provided. As shown in FIGS. 8 and 9, the over-voltage information from the vehicle generator 3 is inputted to the vehicle information transmit/receive means 31, and failure information is extracted at failure information extraction generation means 33 and fed to the over-voltage determination means 16. Further, the over-voltage determination means 16 determines the over-voltage information and fed it to the secondary failure avoiding control means 20.

The secondary failure avoiding control means 20 starts its operation when the over-voltage information is inputted from both the over-voltage determination means 16 and the battery voltage abnormality determination means 21. Feeding the signal to the electric load control information extraction generation means 27 and the maximum engine speed limiting means 13, the secondary failure avoiding control means 20 imposes a limit on the engine speed of the internal combustion engine land, accordingly, on the revolving speed of the vehicle generator 3. At the same time, the secondary failure avoiding control means 20 produces a control information signal depending on a degree of the over-voltage information, and outputs it from the vehicle information transmit/receive means 31. The electric load commanded in response to this control information signal is brought into a state of operation in the same manner as in the foregoing third embodiment. Further, the manipulation signals from the switches 8 provided at the driver's seat are also processed in the same manner as in the foregoing second and third embodiments.

In the case where the over-voltage determination means 16 determines the over-voltage failure, this information is returned to the failure information extraction generation means 33, and failure information is produced. The failure information is transmitted from the vehicle information transmit/receive means 31, and is fed to the alarm display control means 32. As the information is the over-voltage failure, the alarm display control means 32 causes the alarm display means 19a indicating the over-voltage failure to be lit. In this manner, a variety of information are inputted or outputted to and from one input/output terminal, and therefore it becomes possible to reduce number of the input/output interface circuits and achieve the same advantages as in the foregoing second embodiment.

In the internal combustion engine control system for vehicle according to the invention, it is determined that there is any abnormality in the generated voltage or the battery voltage when the generated voltage and/or the battery voltage continue to be over a predetermined value during a predetermined time period. As a result, it is possible to avoid a misjudgment due to an overshoot phenomenon in the generated voltage when the load for the vehicle generator varies sharply, whereby the determination of over-voltage can be surely conducted.

In the internal combustion engine control system for vehicle according to the invention, the control of the electric load control means is made by the secondary failure avoiding control means so that the electric load may be ON or OFF without manipulation of vehicle driver. As a result, the generated voltage in case of any abnormality is automatically controlled without imposing any excess burden on the driver.

In the internal combustion engine system for vehicle according to the invention, among the electric loads mounted onto the vehicle, the electric load having been manipulated by the vehicle driver is excluded from the control to be made by the electric load control means. As a result, the electric load required for the traveling conditions is not OFF due to variation in voltage and consequently a safe traveling is assured.

In the internal combustion engine control system for vehicle according to the invention, the electric load to be controlled by the electric load control means is selected among the electric loads mounted on the vehicle. Those electric loads consume a large electric power and are not dangerous even when applied without manipulation of the driver. As a result, the voltage control can be effectively carried out to overcome the over-voltage failure, and there is no possibility that automatically applying the electric load becomes an obstacle to the vehicle driving.

In the internal combustion engine control system for vehicle according to the invention, the electric load to be controlled by the electric load control means is any of headlight, heater heating wire, cooler compressor motor, widow defroster heating wire and cooling fan motor of the vehicle. As a result, automatically applying any of these electric loads does not bring any large obstacle to the operation of the vehicle. Further, the vehicle can travel safely to a repair plant or the like after the failure.

In the internal combustion engine control system for vehicle according to the invention, each electric load to be controlled by the electric load control means is provided with switching means, and the switching means is controlled in response to a command signal from the electric load control means. As a result, the control of the over-voltage trouble becomes possible by utilizing a communication line such as vehicle-mounted LAN.

In the internal combustion engine control system for vehicle according to the invention, the electric load to be controlled by the electric load control means is respectively provided with identification means for identifying a personal code, and the command signal from the electric load control means includes at least an identification code representing a controlled object and a command code of ON or OFF. As a result, each electric load can be controlled by means of a multiplex communication line, and the secondary failure can be easily prevented without increasing wire harness.

In the internal combustion engine control system for vehicle according to the invention, the secondary failure avoiding control means controls the electric load control means to monitor operation period of time of the electric load under ON state, and switches the mentioned electric load to another electric load when the operation time of the electric load exceeds a predetermined value. As a result, a trouble due to continuous application of the electric load can be preliminarily prevented.

In the internal combustion engine control system for vehicle according to the invention, the secondary failure avoiding control means monitors temperature of said electric load under the ON state by controlling said electric load control means, and switches one electric load to another when the temperature of said electric load exceeds a predetermined value. As a result, any thermal trouble due to continuous application of the electrical load can be preliminarily prevented.

In the internal combustion engine control system for vehicle according to the invention, the secondary failure avoiding control means that controls the maximum engine speed limiting means and the electric load control means monitors a traveling state of the vehicle, controls a limit value of the maximum engine speed by the maximum engine speed limiting means in accordance with the traveling state as well as controls the electric load to be ON in accordance with the limit value of the maximum engine speed. As a result, the engine speed of the internal combustion engine is not set simply from the viewpoint of the over-voltage failure, thus allowing the traveling of the vehicle to have a freedom based on the intention of the driver.

In the internal combustion engine control system for vehicle according to the invention, in the case where any abnormality in the generated voltage and the battery voltage has been solved, after determining that the generated voltage and the battery voltage get into the abnormality and exceed a predetermined value and starting control operation by the secondary failure avoiding control means, the control by the secondary failure avoiding control means is stopped. As a result, restoration to the normal operation is possible in case of any temporary trouble such as instable connection of the circuit. Furthermore, the restoration is conducted only in the case where the abnormality in both of the generated voltage and the battery voltage has been solved and, therefore, misjudgment due to temporal change in conditions can be avoided.

In the internal combustion engine control system for vehicle according to the invention, the system includes alarm display means for indicating any abnormality when determining that the generated voltage and the battery voltage exceed a predetermined value, and the alarm display means continues to indicate the abnormality even when the abnormality in the generated voltage and the battery voltage is solved after operation of the secondary failure avoiding control means. As a result, any temporary failure is notified to the driver so that the abnormal state may be made clear.

In the internal combustion engine control system for vehicle according to the invention, the vehicle is provided with a control device for a traveling system that controls automatic transmission, and the secondary failure avoiding control means commands the control device to reduce a revolving speed for a gear change control in the automatic transmission when determining that the generated voltage and/or the battery voltage exceeds a predetermined value. As a result, it becomes possible for the driver to travel the vehicle to the repair plant nearly in a normal traveling without exceedingly increasing the engine speed of the internal combustion engine.

What is claimed is:

1. An internal combustion engine control system for vehicle comprising:

power generation information monitor means for monitoring a power generation information including a voltage generated by a vehicle generator driven by means of an internal combustion engine;

maximum engine speed limiting means for imposing a limit on a maximum engine speed of said internal combustion engine using a command signal; and secondary failure avoiding control means for feeding said command signal to said maximum engine speed limiting means and maintaining the voltage generated by said vehicle generator at a normal value to avoid a secondary failure due to abnormality in said generated voltage in the case where it is determined that said generated voltage exceeds a predetermined value, wherein the system includes electric load control means for ON/OFF controlling an electric load that receives a power supply from said battery; and said secondary failure avoiding control means controls said maximum engine speed limiting means and said electric load control means thereby controlling a revolving speed of said vehicle generator and an electric load, and maintains said generated voltage at a normal value to avoid the secondary failure, in the case where it is determined that said generated voltage exceeds a predetermined value.

2. The vehicle internal combustion engine system according to claim 1, wherein control of said electric load control means executed by said secondary failure avoiding control means is carried out in such a manner that said electric load may be ON or OFF without manipulation of vehicle driver.

3. The vehicle internal combustion engine system according to claim 2, wherein among said electric loads mounted on said vehicle, an electric load having been manipulated by said vehicle driver is excluded from being controlled by said electric load control means.

4. The internal combustion engine control system for vehicle according to claim 1, wherein said electric load controlled by said electric load control means is selected among the electric loads mounted on said vehicle, said selected electric load consuming a large electric power and not causing a dangerous vehicle-operating state when applied without manipulation of the vehicle driver.

5. The internal combustion engine control system for vehicle according to claim 4, wherein said electric load controlled by said electric load control means is any of headlight, heater heating wire, cooler compressor motor, window defroster heating wire and cooling fan motor of said vehicle.

6. The internal combustion engine control system for vehicle according to claim 1, wherein said electric loads controlled by said electric load control means are respectively provided with switching means, and each of said switching means is controlled in response to a command signal from said electric load control means.

7. The internal combustion engine control system for vehicle according to claim 6, wherein said electric loads controlled by said electric load control means are respectively provided with identification means for identifying a personal code, and the command signal from said electric load control means at least comprises an identification code of an object to be controlled and a command code of ON or OFF.

8. The internal combustion engine control system for vehicle according to claim 1, wherein said secondary failure avoiding control means controls said electric load control means to monitor operation time of said electric load under an ON state, and switches one electric load to another when operation time of said electric load exceeds a predetermined value.

9. The internal combustion engine control system for vehicle according to claim 1, wherein said secondary failure avoiding control means monitors temperature of said electric load under the ON state by controlling said electric load control means, and switches one electric load to another when the temperature of said electric load exceeds a predetermined value.

10. The internal combustion engine control system for vehicle according to claim 1, wherein said secondary failure avoiding control means that controls said maximum engine speed limiting means and said electric load control means monitors a traveling state of said vehicle, controls a limit value of a maximum engine speed by said maximum engine speed limiting means in accordance with said traveling state as well as controls said electric load to be ON in accordance with the limit value of said maximum engine speed.

11. An internal combustion engine control system for vehicle comprising:
- battery voltage monitor means for monitoring a battery voltage charged from a vehicle generator driven by means of an internal combustion engine;
- maximum engine speed limiting means for imposing a limit on a maximum engine speed of said internal combustion engine using a command signal; and
- secondary failure avoiding control means for feeding said command signal to said maximum engine speed limiting means, suppressing abnormality in battery voltage by maintaining a voltage generated by said vehicle generator at a normal value, and avoiding a secondary failure due to abnormality in battery voltage in the case where it is determined that said battery voltage exceeds a predetermined value.

12. The vehicle internal combustion engine system according to claim 11, wherein it is determined that there is any abnormality in said generated voltage or said battery voltage when said generated voltage and/or said battery voltage continues to be over a predetermined value during a predetermined period of time.

13. The internal combustion engine control system for vehicle according to claim 12, wherein in the case where any abnormality in said generated voltage and said battery voltage has been solved, after determining that said generated voltage and said battery voltage get into said abnormality and exceed a predetermined value and starting control operation by said secondary failure avoiding control means, the control operation by said secondary failure avoiding control means is stopped.

14. The internal combustion engine control system for vehicle according to claim 13, wherein the system includes alarm display means for indicating any abnormality when determining that said generated voltage and said battery voltage exceed a predetermined value, and said alarm display means continues to indicate the abnormality even when the abnormality in said generated voltage and said battery voltage is solved after operation of the secondary failure avoiding control means.

15. An internal combustion engine control system for vehicle comprising:
- power generation information monitor means for monitoring a power generation information including a voltage generated by a vehicle generator driven by means of an internal combustion engine;
- maximum engine speed limiting means for imposing a limit on a maximum engine speed of said internal combustion engine using a command signal; and
- secondary failure avoiding control means for feeding said command signal to said maximum engine speed limiting means and maintaining the voltage generated by said vehicle generator at a normal value to avoid a secondary failure due to abnormality in said generated voltage in the case where it is determined that said generated voltage exceeds a predetermined value,
- wherein said vehicle comprises a control device for a traveling system to control automatic transmission, and said secondary failure avoiding control means commands said control device for the traveling system to reduce a revolving speed for gear change control in said automatic transmission when determining that said generated voltage and/or said battery voltage exceeds a predetermined value.

16. A method for controlling a vehicle internal combustion engine includes steps of: detecting a voltage generated by a vehicle generator driven by means of an internal combustion engine and a battery voltage charged from said vehicle generator; operating maximum engine speed limiting means for imposing a limit on a maximum engine speed of said internal combustion engine to impose a limit on a revolving speed of said vehicle generator when said generated voltage exceeds a predetermined voltage; and, when said generated voltage exceeds said predetermined voltage, maintaining said generated voltage and said battery voltage at a normal value by turning ON or OFF an electric load that receives a power supply from said battery to avoid a secondary failure due to abnormality in voltage.

* * * * *